April 25, 1933. A. COUWENHOVEN 1,905,808
MOTOR CONTROL SYSTEM
Filed March 18, 1929
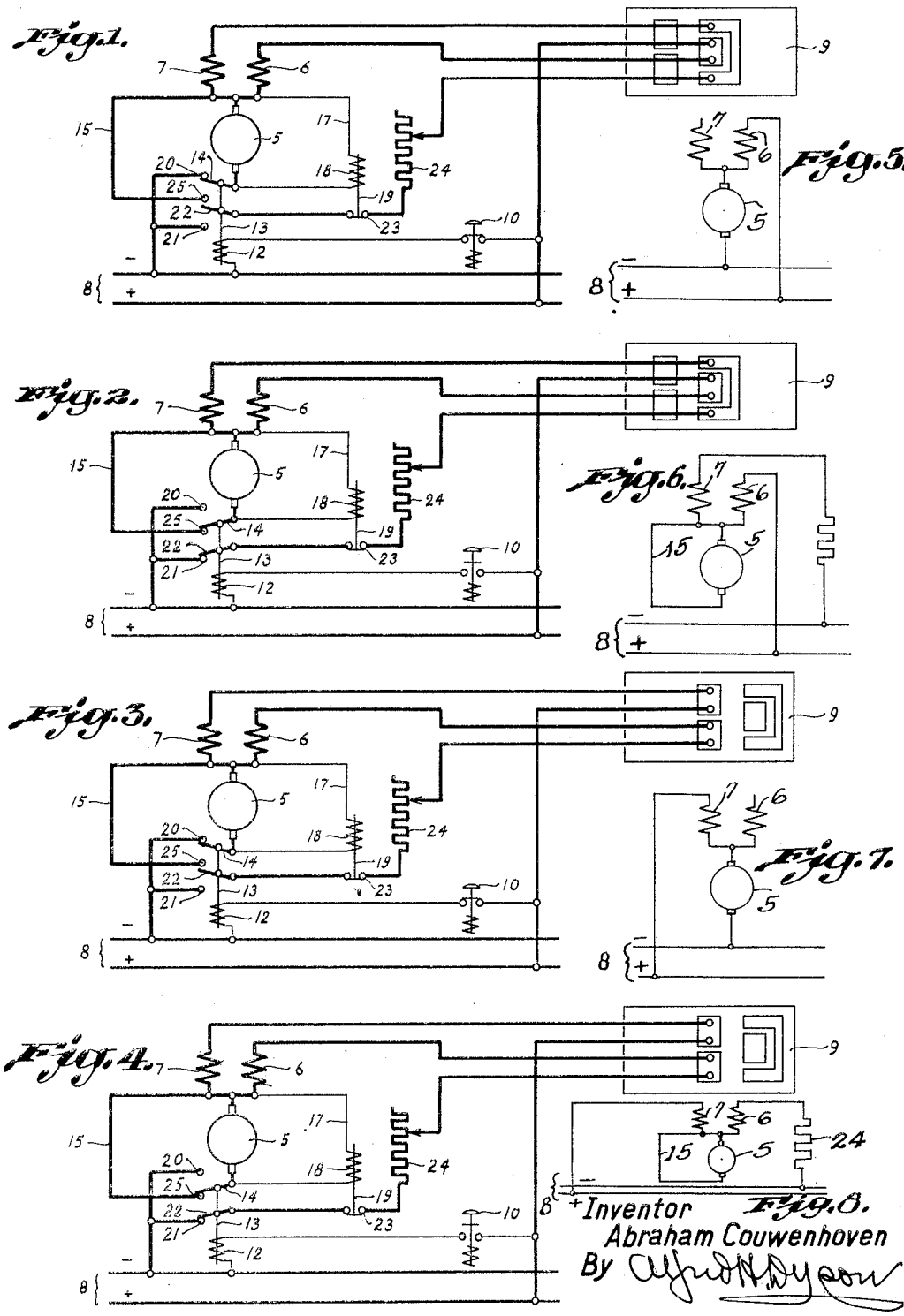
Inventor
Abraham Couwenhoven
By Alfred N. Dyson
Attorney Patented Apr. 25, 1933

1,905,808

UNITED STATES PATENT OFFICE

ABRAHAM COUWENHOVEN, OF BADEN, SWITZERLAND, ASSIGNOR TO AKTIENGESELL-SCHAFT BROWN, BOVERI & CIE., OF BADEN, SWITZERLAND, A JOINT-STOCK COMPANY OF SWITZERLAND

MOTOR CONTROL SYSTEM

Application filed March 16, 1929, Serial No. 347,871, and in Germany March 19, 1928.

This invention relates to improvements in electric motor control systems and especially to systems for controlling the operation of motors for switch drums of railway locomotives and for rotating the cable drums of elevators, cable railways, cranes or the like.

In the usual electric motor driven elevating or hoisting device, the motor was necessarily connected indirectly with the cable drum by means of a brake or similar device for the purpose of taking up the force remaining in the rotor after the electric current to the motor was cut off. Any such mechanical absorption of the energy residue in an electric motor tends to prohibit the exactness of operation required to permit accurate placing of the car, to be raised or lowered, at the desired point.

It is, therefore, among the objects of the present invention to provide electrical means for braking a motor thereby providing a more exact control of the rotation of such motor.

Another object of the present invention is to provide a circuit for electrically braking the rotor of an electric motor.

A further object of the present invention is to provide a circuit to secure dynamic braking of an electric hoisting motor.

Objects and advantages, other than those above set forth, will be apparent from the description considered with the drawing in which:

Figure 1 is a diagrammatic view of the connection of an electric hoisting motor, embodying the invention, shown in position for hoisting or elevating;

Fig. 2 is a view similar to Fig. 1 but showing the connections in position for braking from the hoisting position;

Fig. 3 is a diagrammatic view of an embodiment of the invention showing the connections arranged for lowering;

Fig. 4 is a view similar to that shown in Fig. 3 with the connections arranged for braking from the lowering positions;

Fig. 5 diagrammatically shows the main circuit connections of the system in the position illustrated in Fig. 1;

Fig. 6 diagrammatically shows the main circuit connections of the system in the position illustrated in Fig. 2;

Fig. 7 diagrammatically shows the main circuit connections of the system in the position illustrated in Fig. 3; and Fig. 8 diagrammatically shows the main circuit connections of the system in the position illustrated in Fig. 4.

Referring more particularly to the drawing by characters of reference, reference numeral 5 indicates the rotor of a motor connected directly to the switch drum of a locomotive (not shown) or the cable drum (not shown) of an elevator, cable railway or the like. The motor is provided with two excitation windings 6 and 7 to permit operation of the motor in either direction of rotation. The windings 6, 7 are alternately supplied with current from a circuit 8 through proper connections in a rotary switch 9. A switch 10, the purpose of which will appear hereinafter, is connected with one side (the positive side) of supply circuit 8 and with a coil 12 of a relay for actuating an armature 13 thereof, which coil is connected with the other side (the negative side) of circuit 8.

A short circuiting circuit is arranged about the rotor 5 and includes the low resistance conductor 15 which may be interrupted by opening a switch 14 and a conductor 17 which includes a coil 18, for actuating an armature 19, connected across the rotor for permitting energization of the coil 18 when the rotor is running and to delay deenergization of coil 18 when the rotor is short-circuited.

The negative side of supply circuit 8 is extended to provide one contact point 20 for switch 14 and to provide one contact point 21 for a switch 22 which is arranged to be opened by the armature 13 of the relay operating the switch 14. Switch 22 forms a portion of a circuit through a switch 23, and a variable resistance 24 to one of the contacting points of switch 9. For purposes of illustration, let it be considered that the motor is to be run to rotate a cable drum (not shown) for raising or elevating a car (not shown), closing of switch 10 permits flow of current from the positive side of circuit 8 through coil 12 thereby causing armature 13 to raise switch 14 to complete the circuit through winding 6 and rotor 5 to the negative side of circuit 8. The motor accordingly operates in the direction determined by winding 6. Contact 25 is opened simultaneously with the raising of switch 14 by armature 13 thereby opening the rotor short circuiting circuit 15.

When the car (not shown) has been elevated to the desired point, switch 10 is opened thereby interrupting the supply of current to coil 12 which, being deenergized, permits armature 13 to drop to cause switches 14 and 22 to engage the contacts 21 and 25 of the rotor short circuit to complete the same. Current flowing through conductor 17 has energized coil 18 during the time the motor was running thereby causing armature 19 to close contacts 23 to complete a circuit from the negative side of circuit 8 through switch 22, resistance 24, and rotary switch 9 to winding 7. Both windings 6 and 7 being now in series and rotor 5 being short circuited, the motor now acts as a generator which effectually brakes the forward momentum thereof.

When it is desired to lower the car from the rest position, switch 9 is rotated to change the connections of winding 6 and 7 to those shown in Fig. 3. Switch 10 is now again closed thereby permitting energization of coil 12 which causes armature 13 to complete a circuit through rotor 5 from winding 7 to the negative side of circuit since winding 7 is already connected with the positive side of circuit 8 through change of switch 9. The motor now operates under the influence of winding 7 and therefore rotates in a direction opposite to the direction of rotation when winding 6 is energized and the action of the shunt circuit including coil 18 is now the same as above-described with reference to Fig. 1.

The braking action of the motor from the connections when the car is being lowered is now secured by opening switch 10 which causes coil 12 to become deenergized so that armature 13 drops and permits switches 14 and 22 to drop. Switch 14 completes the rotor short circuiting circuit. Switch 22 and contacts 23 complete a circuit from the negative side of circuit 8 through resistance 24 and rotary switch 9 to winding 6. Windings 6 and 7 being again connected in series the motor now again operates as a generator under action of the excited windings 6 and 7, as above described, and quickly absorbs the energy of the rotor thereby bringing the same quickly to a standstill.

It will be apparent that the present invention provides a means for dynamically braking a motor by such simple and effective means that the exactness of control of any device driven by the motor is materially improved. Further, the action of the braking circuits may be varied by proper variation of the resistance 24 in such manner that the motor may be braked near the end of the path of travel of the car to be elevated to automatically bring the car to rest at the proper point.

Although only one embodiment of this invention has been illustrated and described, it will be understood that various other embodiments are possible, and that various changes may be made without departing from the spirit of the invention or the scope of the claims.

The invention claimed is:

1. In an electric motor control system, a source of current supply, a motor comprising a plurality of field excitation windings and an armature winding, means including a reversing switch operative to a plurality of positions to selectively connect one or another of said field windings in series circuit with said armature winding and with said source of current, a low resistance disposed to be connected in shunt circuit with said armature winding, a current limiting resistance disposed to be connected in series circuit with said field windings and said source of current, an electromagnetically actuated switch operable to a plurality of positions, the said electromagnetically actuated switch being effective when operated to one of its said positions to connect said armature winding in operative circuit with said source of current and effective when operated to another of said positions to connect said low resistance in shunt circuit with said armature winding and to connect said current limiting resistance in series circuit with said field windings and said source of current.

2. In an electric motor control system, a source of current supply, a motor comprising a plurality of field excitation windings and an armature winding, means including a reversing switch operative to a plurality of positions to selectively connect one or another of said field windings in series circuit with said armature winding and with said source of current, a low resistance disposed to be connected in shunt circuit with said armature winding, an adjustable current limiting resistance disposed to be connected in series circuit with said field windings and said source of current, an electromagnetically actuated switch operable to a plurality of positions, the said electromagnetically switch being effective when operated to one of its said positions to connect said armature winding in operative circuit with said source of current and when operated to another of its said positions to connect said low resistance in shunt circuit with said armature winding and to connect said current limiting resistance in series circuit with said field windings and said source of current, and electromagnetically actuated means operative to effect disconnection of said current limiting resistance and said source of current from operative connection with said field windings.

3. In an electric motor control system, a source of current supply, a motor comprising a plurality of field excitation windings and an armature winding, means including a reversing switch operative to a plurality of positions to selectively connect one or another of said field windings in series circuit with said armature winding and said source of current to cause said armature winding to be rotated in one or another direction in dependence upon the operated position of said switch, a conductor disposed to be connected with said armature winding to substantially effect the short circuit thereof, an adjustable current limiting resistance disposed to be connected in series circuit with said field windings and said source of current to limit the flow of said current through said field windings, an electromagnetically actuated switch operable to a plurality of positions effective when actuated to one of its said positions to connect said armature in operative series circuit with said source and one or another of said field windings and when operated to another of its said positions to disconnect said armature winding from said source of current and to connect said conductor in shunt with said armature winding to short circuit the latter, and electromagnetically actuated means connected in shunt circuit with said armature winding operatively responsive to connection of said conductor with said armature winding effective to interrupt the said operative series circuit connection of said current limiting resistance and said source of current with the said field windings.

In testimony whereof I have hereunto subscribed my name this 6th day of March A. D. 1929.

ABRAHAM COUWENHOVEN.